United States Patent [19]

Geiser

[11] Patent Number: 5,421,379
[45] Date of Patent: Jun. 6, 1995

[54] METHOD AND APPARATUS FOR DISTRIBUTING GRANULAR MATERIAL WITHIN A CONTAINER

[75] Inventor: Richard L. Geiser, Goshen, Ind.

[73] Assignee: CTB Inc., Milford, Ind.

[21] Appl. No.: 126,270

[22] Filed: Sep. 24, 1993

[51] Int. Cl.⁶ ............................................. B65G 65/32
[52] U.S. Cl. ........................................ 141/1; 141/286; 141/4; 414/299; 239/687; 239/498
[58] Field of Search ............... 141/286, 4, 98, 1; 414/288, 297, 298, 299; 239/672, 498, 500, 501, 518, 222.15, 222.17, 687, 681

[56] References Cited

U.S. PATENT DOCUMENTS

| | | |
|---|---|---|
| 1,047,755 | 12/1912 | Craig . |
| 1,615,878 | 2/1927 | Laird . |
| 3,349,929 | 10/1967 | Berger ............................ 414/299 |
| 3,488,007 | 1/1970 | Nevenschwander ............... 239/687 |
| 3,682,394 | 8/1972 | Shivers ......................... 239/687 X |
| 3,733,764 | 5/1973 | Hege . |
| 3,791,592 | 2/1974 | Cobb ............................. 239/687 X |
| 3,880,300 | 4/1975 | Uhl ............................... 239/687 X |
| 3,961,660 | 6/1976 | Vinci . |
| 4,208,839 | 6/1980 | Candy, Sr. . |
| 4,267,936 | 5/1981 | Pavlicek . |
| 4,327,522 | 5/1982 | Meadows . |
| 4,424,837 | 1/1984 | Farrell ........................... 141/286 X |
| 4,433,707 | 2/1984 | Farnham ............................... 141/1 |
| 4,598,496 | 7/1986 | Van Daele . |
| 4,625,888 | 12/1986 | Thompson . |
| 4,700,893 | 10/1987 | Bugler, III ........................ 239/498 |
| 4,930,446 | 6/1990 | Huisinga . |
| 4,972,884 | 11/1990 | Sovers et al. ......................... 141/1 |
| 5,158,502 | 10/1992 | Frost . |
| 5,238,035 | 8/1993 | Poussin et al. .................... 141/286 |
| 5,280,813 | 1/1994 | Jackson ............................... 141/4 |

Primary Examiner—Ernest G. Cusick
Attorney, Agent, or Firm—Harness, Dickey & Pierce

[57] ABSTRACT

A method and apparatus for distributing granular material within a container. The apparatus includes a base member for uniformly distributing the granular material within the container by absorbing momentum from the inflow of the granular material. The method includes forming at least two flow paths for the inflow of granular material and then changing the flow of granular material through each of the flow paths to cause a substantially even distribution of granular material within the container.

45 Claims, 7 Drawing Sheets

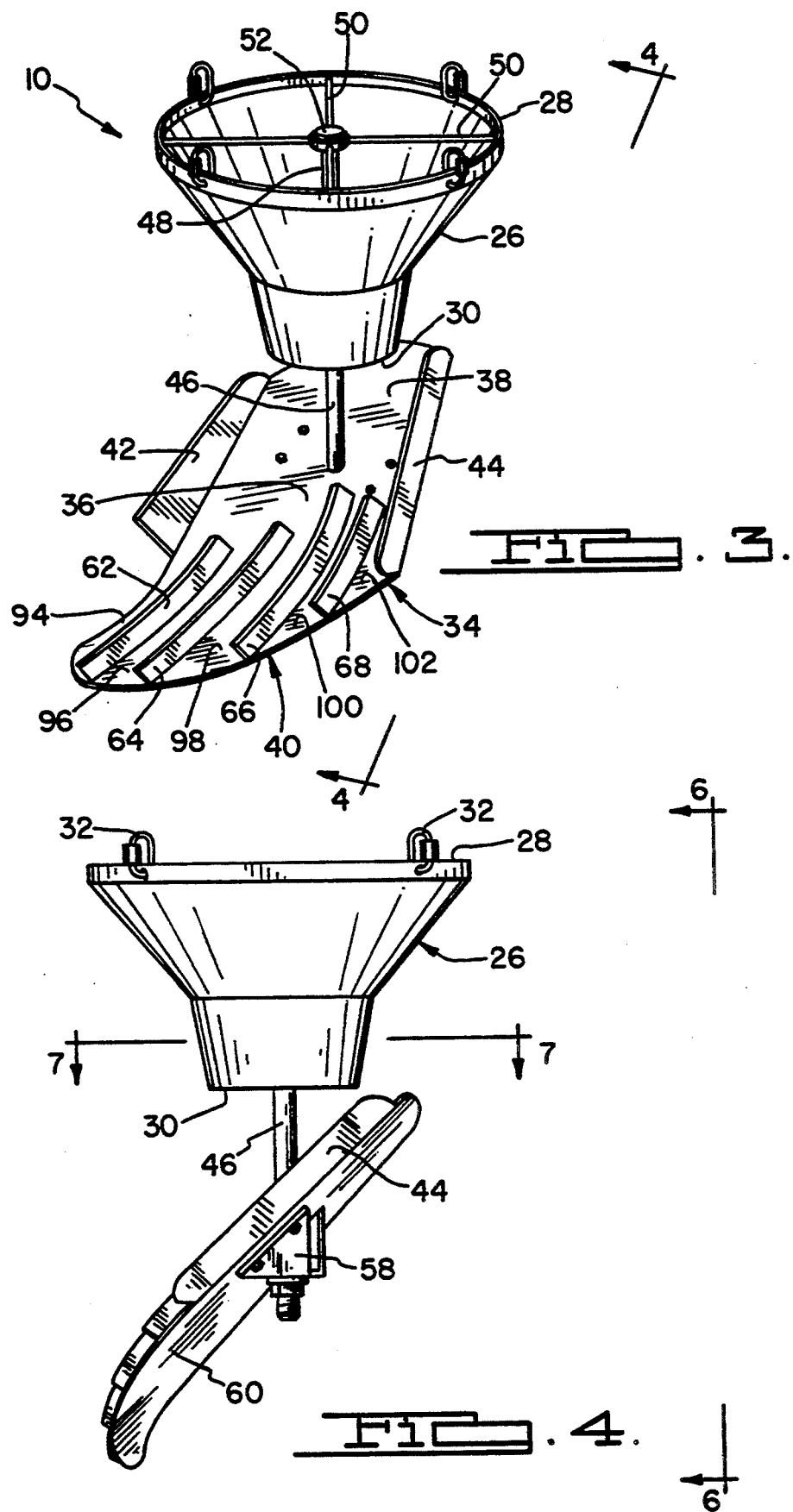

METHOD AND APPARATUS FOR DISTRIBUTING GRANULAR MATERIAL WITHIN A CONTAINER

BACKGROUND OF THE INVENTION

1. Field of the Invention

This invention relates to the storage of granular material such as animal feed, and more particularly to a method and apparatus for distributing granular material within a container.

2. Description of the Related Art

In various industries such as those involving agriculture and manufacturing, it is often necessary to store relatively large amounts of granular material. In agriculture, for example, it is often necessary to store substantial quantities of feed for animal husbandry operations. When used in such industries, the granular material is often initially loaded into an opening located at the top of a container which is used for temporary storage of the granular material. The granular material is then later removed from the container immediately prior to use through an opening located at the bottom of the container.

Depending on the nature of the granular material that is being stored, there are often difficulties associated with using such containers. For example, granular material may often include a number of different constituents which tend to separate when loaded into a container. For example, feed for chickens generally includes a fine constituent which tends to be located in the center of the container while the container is being loaded, as well as a coarse constituent which tends to be located near the walls of the container when the container is being loaded. Because the constituents separate in this manner when they are loaded into the container, it is not generally possible to remove the granular material from the container with the same proportion of constituents as was present when the granular material was loaded into the container. In animal husbandry operations, this separation of the constituents of the feed may typically cause lower productivity. Accordingly, there is a need for substantially uniformly distributing the constituents of the granular material within the container.

In addition, granular material which is loaded into a container may not be evenly distributed within the container in that there may be a large variation in the height of the granular material around the uppermost region of the container. Not only does this reduce the effective storage capacity of the container, but the areas within the container which are not filled with granular material allow moisture to accumulate which tends to cause the granular material to degrade to various processes such as by the formation of mold. Accordingly, there is also a need for substantially evenly distributing the granular material within the container.

Various methods and devices have been developed in an effort to distribute granular material entering a container. As shown in FIG. 1, one particular type of device, generally known as a spreader, has been used for distributing grain within a grain bin. Such a spreader is typically located at the upper region of the grain bin and includes a slide which is rotated by a motor. As the granular material is delivered to the slide, the granular material flowing along the slide is distributed at various locations within the grain bin.

While such a spreader has been used generally successfully in distributing grain with a grain bin, there are nevertheless several disadvantages associated with such a spreader. For example, the use of a motor to rotate the slide necessarily increases the cost of the spreader. In addition, the use of a motor to rotate the slide tends to make the operation of the spreader susceptible to motor failure and therefore less reliable. Furthermore, it is not generally easy to determine whether or not the motor driving the slide has indeed failed thereby causing the slide not to rotate because the slide and the motor are generally hidden from view. Finally, such a spreader has generally only been associated with the distribution of grains in grain bins and has not generally been used to distribute animal feed in feed bins.

SUMMARY OF THE INVENTION

In one embodiment, the present invention relates to an apparatus for distributing an inflow of granular material into a container, the inflow of the granular material entering the container with a given momentum. The apparatus includes means for distributing the granular material in the container by absorbing momentum from the inflow of the granular material.

In another embodiment, the present invention relates to a method for distributing a nonuniform inflow of granular material into a container. The method includes the step of forming at least a first and second flow path for the inflow of the granular material, the first and second flow paths being operable to distribute the granular material into the container. The method also includes changing the flow of granular material through the flow paths so as to cause the granular material to be substantially uniformly distributed within the container.

Accordingly, it is a general object of the invention to provide a method and apparatus for distributing granular material within a container in which the constituents of the granular material are substantially uniformly distributed.

A further object of the present invention is to provide a method and apparatus for distributing granular material within a container in which the level of the granular material in the container is substantially even as the container is being filled.

Another object of the present invention is to provide a method and apparatus for distributing granular material within a container which is able to distribute the granular material by absorbing momentum from the inflow of the granular material.

A further related object of the present invention is to provide a method and apparatus for distributing granular material within a container which is able to reduce the amount of mold which may form on the granular material which is stored in a container.

A related object of the present invention is to provide a method and apparatus for distributing granular material within a container which is able to effectively increase the amount of granular material which is stored within a container.

Another object of the present invention is to provide a method and apparatus for distributing granular material within a container which is relatively simple and low in cost, yet is reliably able to distribute granular material within a container.

BRIEF DESCRIPTION OF THE DRAWINGS

The features of the present invention which are believed to be novel are set forth with particularity in the appending claims. The organization and manner of operation of the invention, together with the further objects and advantages thereof, may best be understood by reference to the following description taken in conjunction with the accompanying drawings, in which identical reference numerals identify similar elements, and in which:

FIG. 3 is a perspective view of the apparatus for distributing granular material as shown in FIG. 2 according to the teachings of one preferred embodiment of the present invention;

FIG. 4 is a side elevational view of the apparatus for distributing granular material according to the teachings of one preferred embodiment of the present invention taken along lines 4—4 in FIG. 3;

DESCRIPTION OF THE PREFERRED EMBODIMENTS

The following discussion of the preferred embodiments of the present invention is merely exemplary in nature. Accordingly, this discussion is in no way intended to limit the scope of the invention, application of the invention, or the uses of the invention.

Figure 1:
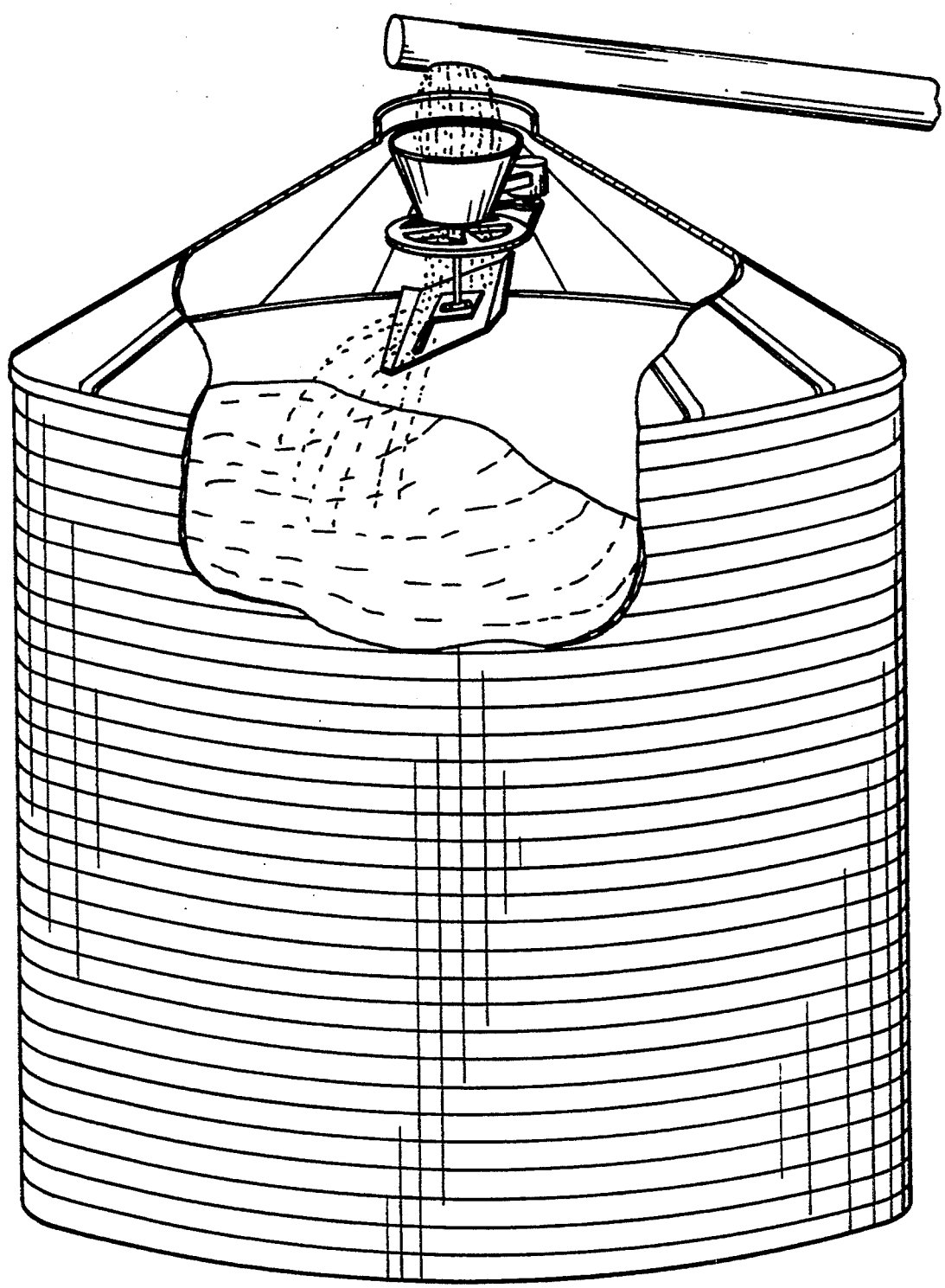
FIG. 1 is a perspective view, partially broken away, of a container for storing granular material of the type which is known in the prior art.
Figure 2:
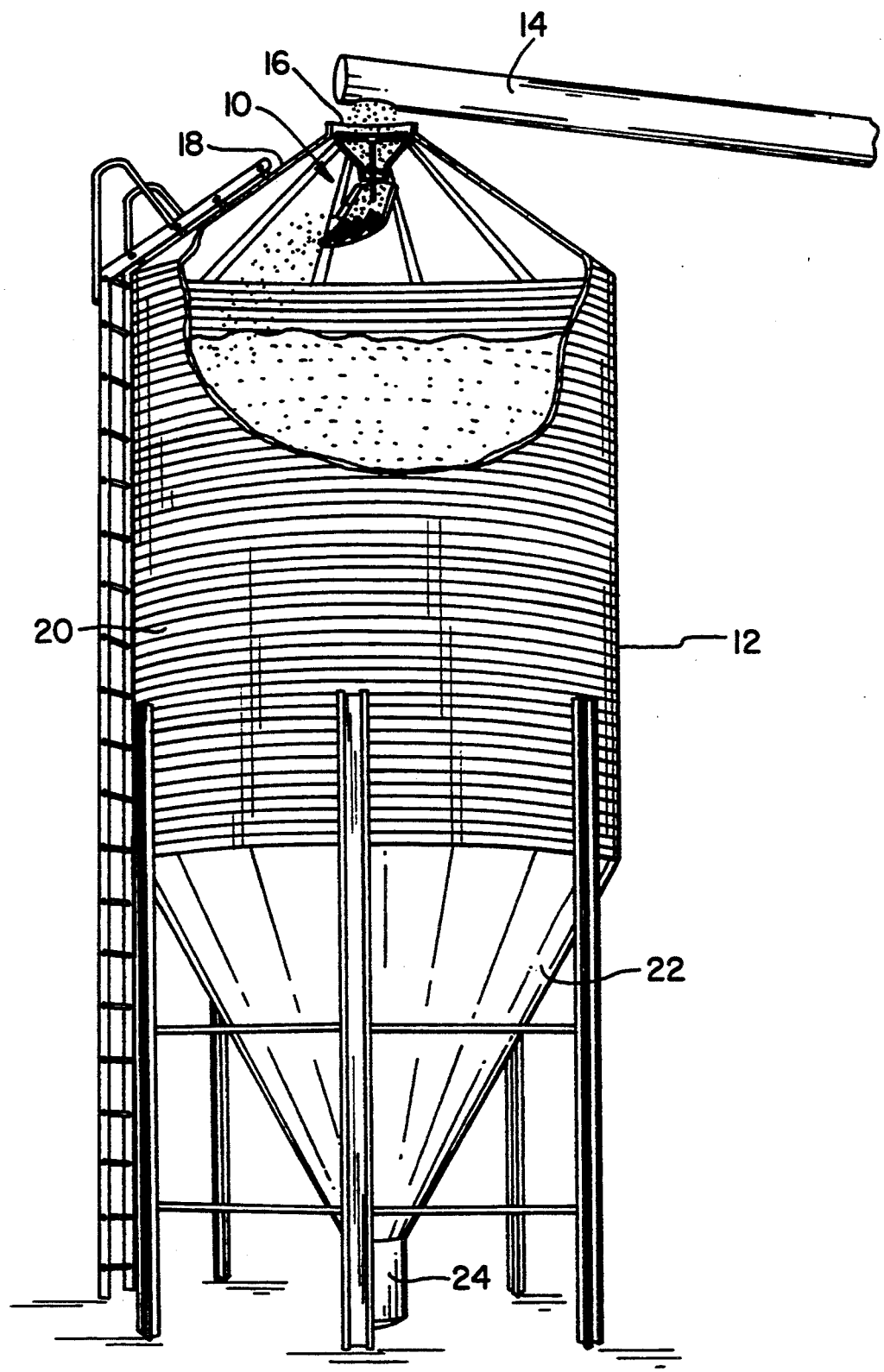
FIG. 2 is a perspective view, partially broken away, of a container having an apparatus for distributing granular material according to the teachings of one preferred embodiment of the present invention.

Referring now to FIG. 2, an apparatus 10 for distributing a granular material is shown. The apparatus 10 may be used to distribute grains, feed or food products or other bulk materials for use in agricultural or industrial use. The granular material may, but not necessarily, be formed from two or more constituents which may have a tendency to separate when being stored. The apparatus 10 is shown in operative association with a container 12 which is used for storing the granular material. The container 12 receives an inflow of granular material from a dispensing device 14 such as an auger or a downspout. In this regard, the granular material enters the lower portion (not shown) of the dispensing device 14 and delivers the granular material to the open end 16 of the container 12. As will be appreciated by those skilled in the art, the inflow of granular material from the dispensing device 14 to the container 12 has a given momentum in that the granular material has both velocity and mass.

The container 12 includes an upper cover portion 18 which is used to cover the granular material within the container 12. The cover portion 18 may include a lid and corresponding opening device (not shown) which is disclosed in U.S. Pat. No. 4,744,183, which is hereby incorporated by reference. The container 12 further includes a generally circular sidewall portion 20 which is used for containing the granular material received by the container 12. In addition, the container 12 includes a lower funnel-shaped portion 22 which is used for guiding the granular material downward into a lower outlet portion 24. As those skilled in the art will appreciate, the lower outlet portion 24 permits removal of the granular material from the container 12 by any suited means such as that which is disclosed in U.S. Pat. No. 4,640,230, which is hereby incorporated by reference.

Preferably, the cover portion 18 is generally conical in shape and has an angle of inclination which is substantially equal to the angle of repose of the granular material. For example, if the granular material is chicken feed which has an angle of repose of approximately 40°, then the angle of inclination of the cover portion 18 is preferably also approximately 40°. Because the angle of inclination of the cover portion 18 is relatively large, a greater amount of granular material can be stored in the container 12. This is because the volume of the container 12 defined by the walls of the cover portion 18 is larger than when the angle of inclination of the cover portion 18 is lower. In addition, by having the angle of inclination of the cover portion 18 not greater than the angle of repose of the granular material, the space or void created between the granular material and the inner surface of the cover portion 18 is minimized. It will be appreciated that the presence of these spaces or voids may otherwise tend to cause the granular material to degrade such as by the formation of mold.

As will be appreciated by those skilled in the art, the container 12 may be a feed storage bin of the type which is available from Chore-Time or Brock, Milford, Ind. However, it will be understood that the present invention may be used with other types of containers as well as used for distributing other types of granular materials. In this regard, the container 12 may be used for storing other types of agricultural materials, consumable materials, industrial materials, chemical materials as well as virtually any other type of granular material. In addition, while the container 12 is shown as being generally cylindrical in shape with a conically-shaped cover portion 18, the container 12 may be of virtually any other shape which is suitable for storing the granular material. Accordingly, the container may be rectangular, hexagonal, octagonal or any other suitable shape.

The apparatus 10 will now be more fully described with reference to FIGS. 3-7. The apparatus 10 comprises a conical member 26 which has an upper portion 28 which is operable to receive the inflow of granular material from the dispensing device 14. In addition, the conical member 26 has a lower portion 30 which is able to deliver the inflow of granular material to a base member which is more fully described below. The conical member 26 serves to concentrate the inflow of granular material received from the dispensing device 14 and direct the inflow to the base member.

Preferably, the outside diameter of the upper end of the upper portion 28 is about 21 inches, while the inside diameter of the lower end of the lower portion 30 is approximately 8 inches. The height of the conical member 26 is preferably about 12.5 inches. The walls of the upper portion 28 are angled at approximately 40° from vertical, while the walls of the lower portion 30 extend approximately 11° from vertical. The upper portion 28 of the conical member 26 meets the lower portion 30 of the conical member 26 at a point where the inside diameter of the conical member 28 is approximately 10 inches. The upper end of the upper portion 28 includes a 1 inch flat on the upper surface of the conical member 26 so as to provide a region for engaging the mechanical linkages which are described below. It will be appreciated that the conical member 26 may be of other suitable shapes. In addition, while the conical member 26 may preferably be made from 16 gauge galvanized steel, any other suitable materials may be used. Such materials would include polymeric based materials.

The conical member 26 is mechanically connected to the region of the cover portion 18 which is proximate to the open end 16 of the container 12. To provide this mechanical connection, the conical member 26 includes a plurality of mechanical linkages 32 which may be used to removably secure the conical member 26 to the container 12. The mechanical linkages 32 also provide means for changing the position of the base member 46 in response to the height of the granular material within the container 12. In this regard, the mechanical linkages 32 are operable to permit limited rotational movement of the apparatus 10 as the level of the granular material in the container 12 increases to where the granular material contacts the apparatus 10. This limited rotational movement of the apparatus 10 permitted by the mechanical linkages 32 serves to limit damage to the apparatus 10 which may otherwise be caused as the level of the granular material in the container 12 increases and contacts the apparatus 10. While the mechanical linkages 32 made may preferably be chain linkages and/or quick linkages, any other suitable means for securing the conical member 26 to the container 12 may be used. For example, the mechanical linkages 32 may be cables, or any other suitable type of metallic or polymeric fasteners.

To provide means for distributing the granular material within the container 12, the apparatus 10 further includes a base member 34. The base member 34 receives the inflow of the granular material from the conical member 26 and distributes the constituents of the granular material in a substantially uniform manner within the container 12. As a result, the constituents of the granular material are distributed within the container 12 such that the constituents are able to be withdrawn from the container 12 in substantially the same proportion as they were initially delivered to the container 12. For example, in the case of feed for chickens in which the granular material includes both a coarse constituent and a fine constituent, both the coarse and fine constituents are distributed substantially uniformly within the container 12. The fine and coarse constituents are therefore able to be withdrawn from the container 12 so as to provide a uniform source of feed.

In addition, the base member 34 also serves to substantially evenly distribute the granular material within the container. In this regard, the variation in the height of granular material within the container 12 is relatively low. Because the granular material is substantially evenly distributed within the container, the effective storage capacity of the container 12 is increased. In addition, spaces within the container 12 which are not filled with the granular material are minimized which would otherwise allow moisture to accumulate and therefore degrade the granular material such as by the formation of mold.

The base member 34 includes a generally quadrilateral channel or central portion 36 as well as an upper end portion 38 which is generally symmetrically curvilinear in shape and a lower end portion 40 which is generally asymmetrically curvilinear in shape. As will be more fully described below, granular material which is delivered to the base member 34 from the conical member 26 is received by the central portion 36 and then flows along the central portion 36 as well as the lower end portion 40. When the granular material reaches the edge of the lower end portion 40, the granular material falls away from the base member 34 and is substantially evenly distributed into the container 12. The base member 34 further includes a first sidewall member 42 as well as a second sidewall member 44. The first and second sidewall members 42 and 44 are operable to guide the flow of granular material along the central portion 36 to the lower end portion 40 of the base member 34 and prevent the granular material from falling laterally off the sides of the base member 34. The sidewall member 42 is roughly triangular in shape in that the upper region of the sidewall member 42 extends approximately 2 inches from the central portion 36 of the base member 34 while the lower portion of the sidewall member 42 extends approximately 3.6 inches from the central portion 36 of the base member 34. In addition, the second sidewall member 44 is roughly rectangular in shape and extends approximately 2.4 inches upward with respect to the central portion 36 of the base member 34.

To provide means for supporting the base member 34 within the container 12, the apparatus 10 further includes a base support member 46. The base support member 46 extends vertically downward from the conical member 26 to the base member 34. The upper portion 48 of the base support member 46 is secured to the upper portion 28 of the conical member 26 by a first plurality of support members 50. Each of the first plurality of support members 50 mechanically communicates both with a first bearing member 52 and with the upper portion 28 of the conical member 26. In a similar fashion, the base support member 46 is also supported with respect to the lower portion 30 of the conical member 26 by a second plurality of support members 54. The second plurality of support members 54 extend between a second bearing member 56 and a lower portion 30 of the conical member 26. The first and second bearing members 52 and 56 serve to permit relative rotation between the base support member 46 and the conical member 26. In addition, the first and second plurality of support members 50 and 54 serve to direct the flow of granular material within the conical member 26 by limiting rotational movement of the inflow of granular material as the granular material is received by the conical member 26.

To provide means for supporting the base member 32 with respect to the base support member 46, the apparatus 10 further includes a bearing block assembly 58. The bearing block assembly 58 is disposed on the lower surface 60 of the base member 34 and is secured thereto by suitable fasteners such as bolts. In addition, the bearing block assembly 58 also is secured to the lower portion of the base support member 46. It will be appreciated that the bearing block assembly 58 may be of any suitable construction which is capable of supporting the base member 34 with respect to the base support member 46.

Figure 6:
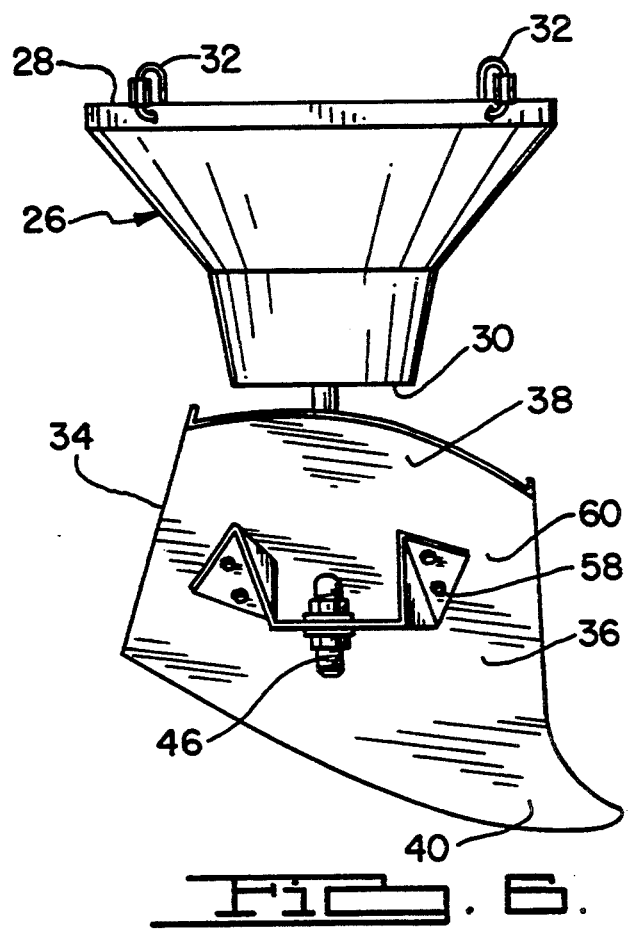
FIG. 6 is a side elevational view of the apparatus for distributing granular material according to the teachings of one preferred embodiment of the present invention taken along lines 6—6 in FIG. 4.
Figure 7:
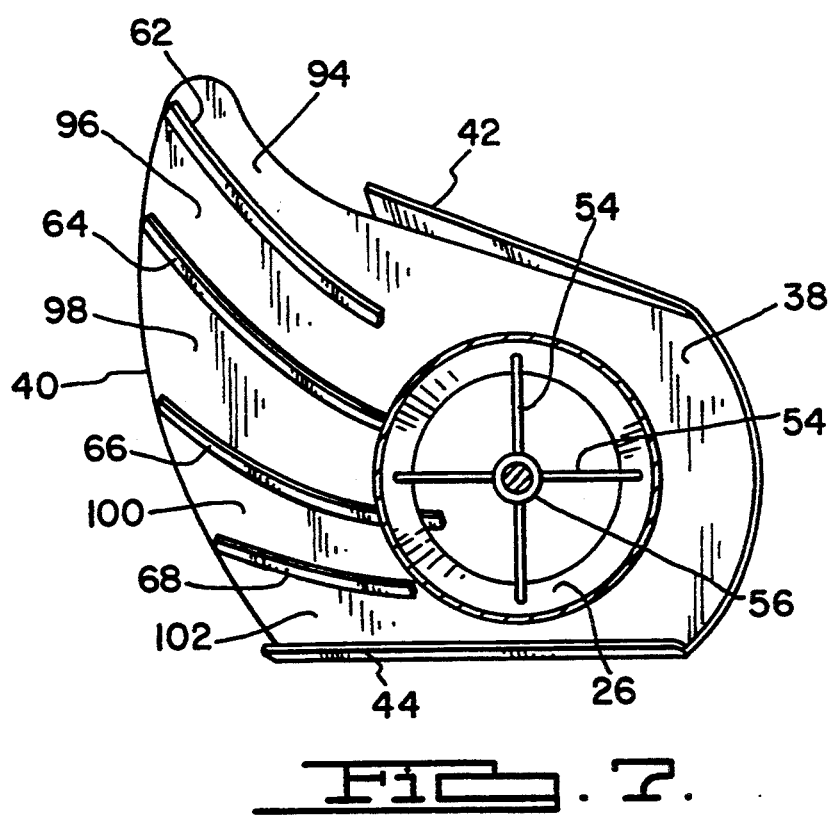
FIG. 7 is a top elevational view of the apparatus for distributing granular material according to the teachings of one preferred embodiment of the present invention taken along line 7—7 in FIG. 4.

The base member 34 is canted with respect to the base support member 46 so as to allow the inflow of granular material to slide along the base member 34 in a direction generally towards the lower lefthand portion of the base member 34 as shown in FIG. 3. In this regard, the base member 34 is canted at an angle of approximately 40°–45° with respect to the base support member 46 when viewed in the manner shown in FIG. 4. In addition, the base member 34 is canted by approximately 5° with respect to base support member 46 when viewed as shown in FIG. 6.

To provide means for forming a plurality of flow paths for the granular material, the base member 34 further includes a plurality of vanes 62–68. The vanes 62–68 serve to absorb momentum from the inflow of granular material in such a manner as to rotate the base member 34 at a substantially constant angular velocity as will be more fully described below. By rotating the base member 34 at a substantially constant angular velocity, the distribution of granular material within the container 12 is substantially even. In this regard, the variation in the height of the granular material within the container 12 across the upper surface of the granular material is substantially within 18 inches while the granular material is being loaded into the container 12.

The vanes 62–68 are disposed on the central portion 36 as well as on the lower end portion 40 of the base member 34 and are of different lengths and shapes. In this regard, the first end 70 of the vane 62 is disposed further from the base support member 46 than the first end 72 of the vane 64. In a similar fashion, the first end 72 of the vane 64 is disposed further from the base support member 46 than the first end 74 of the vane 66. However, the first end 76 of the vane 68 is disposed further from the base support member 46 than the first end 74 of the vane 66. The second ends 78–84 of each of the vanes 62–68 are disposed proximate to the edge of the lower end portion 40 of the base member 34. The vanes 62–68 are secured to the base member 34 by means of a plurality of tabs (not shown) which extend through the central portion 36 and the lower end portion 40 of the base member 34 and are then twisted to provide interfering engagement therewith. In this regard, each of the vanes 62–68 have a tab located at their upper end as well as approximately at their midportions which are operable to be inserted through corresponding slots (not shown) in the base member 34. The lower portions of the vanes 62–68 are not secured to the lower end portion 40 of the base member 34 so as to permit the vanes 62–68 to be manually shaped if necessary to provide proper operation.

The lengths and the shapes of the vanes are selected so that the momentum absorbed by the vanes 62–68 from the inflow of granular material will cause the base member 34 to rotate at a substantially constant angular velocity. With respect to length, it will be noted that the vane 62 is longer than the vane 64, while the vane 64 is longer than the vane 66. In addition, the vane 66 is longer than the vane 68. Preferably, the vane 62 is 11.8 inches in length, while the vane 64 is approximately 12.6 inches in length. The vane 66 is 12.2 inches in length, while the vane 68 is approximately 8 inches in length. It will be appreciated, however, that other suitable lengths may be used which provide substantially the same results as that which is described herein.

With respect to the shape, each of the vanes 62–68 has a corresponding arcuate portions 86–92 which define a concave surface as well as a convex surface. The curvature of the arcuate portions 86–92 for each of the vanes 62–68 is different. Preferably, the arcuate portion 86 of the vane 62 is formed by sweeping an arc of 28.1° at a radius of 24 inches. In a similar fashion, the arcuate portion 88 of the vane 64 is formed by a sweeping an arc of 30.0° at a radius of approximately 24.0 inches. In addition, the arcuate portion 90 of the vane 66 is formed by sweeping an arc of 43.6° at a radius of 16.0°, while the arcuate portion 92 of the vane 68 is formed by sweeping an arc of approximately 19.1° at a radius of approximately 24.0 inches. However, the arcuate portions 86–92 may be of other shapes so long as the vanes 62–68 function in a manner similar to that described herein.

Figure 5:
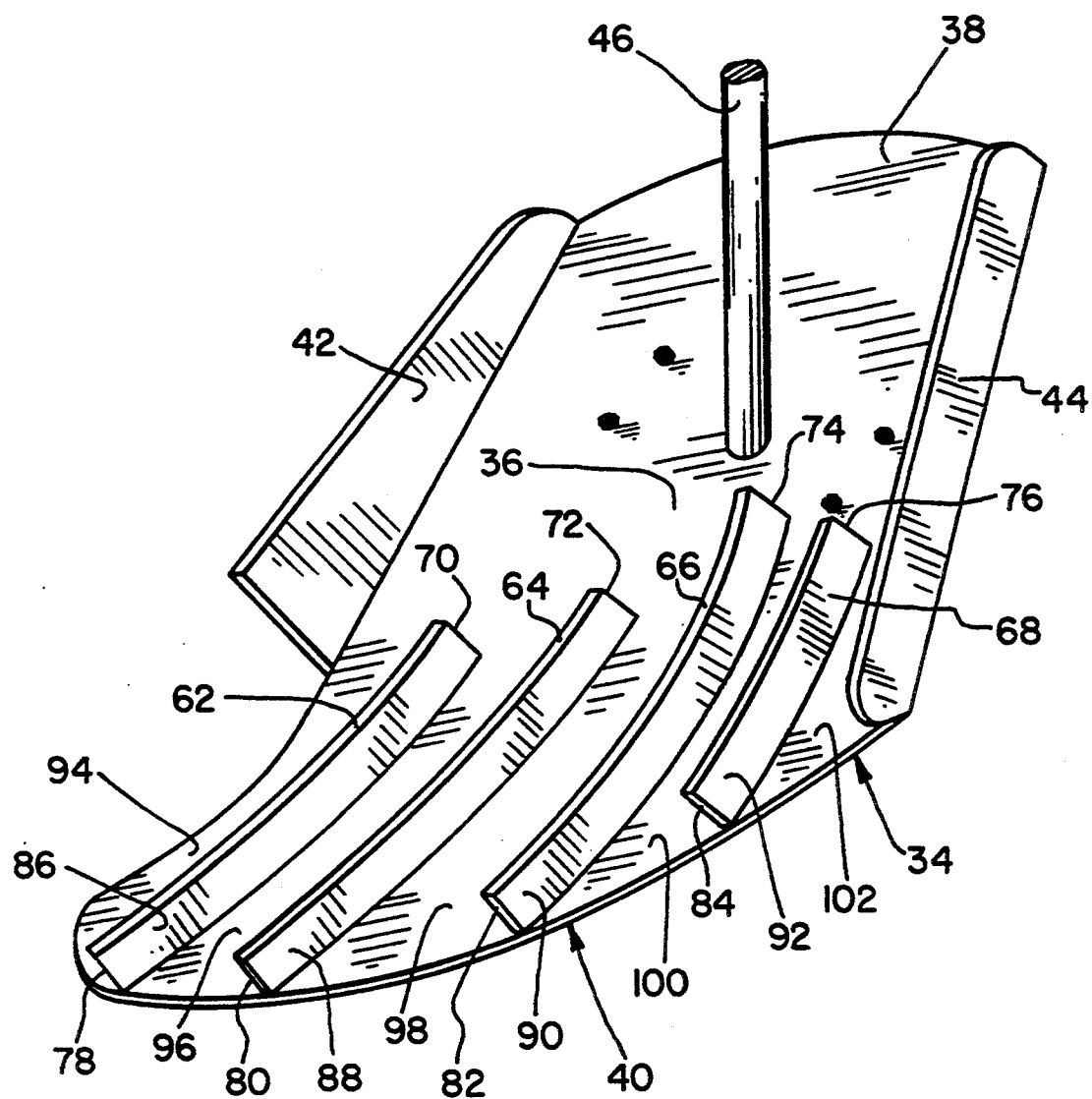
FIG. 5 is an enlarged perspective view of the base member shown in FIG. 3 of the apparatus for distributing granular material according to the teachings of one preferred embodiment of the present invention.

The vanes 62–68 are operable to form a plurality of flow paths 94–102 for the granular material received by the base member 34. In this regard, the flow path 94 is formed between the first sidewall member 42 of the base member 34 and the vane 2. In a similar fashion, the flow path 96 is formed between the vane 62 and the vane 64, while the flow path 98 is formed between the vane 64 and the vane 66. In addition, the flow path 100 is formed between the vane 66 and the vane 68, while the flow path 102 is formed between the vane 68 and the right most edge of the base member 34 as shown in FIG. 5. The amount of granular material flowing through the flow paths 94–102 will vary depending on the rotational position of the base member 34. That is, the amount of granular material flowing through each of the flow paths 94–102 will vary as the base member 34 rotates.

To permit the base member 34 to distribute the granular material in a substantially even fashion within the container 12, it is important that the base member 34 rotate at a substantially constant angular velocity. There are generally three factors which affect the angular velocity at which the base member 34 rotates. These factors are (a) the amount of granular material flowing through each of the flow paths 94–102, (b) the extent to which the vanes 62–68 deflect the flow of granular material and therefore absorb the momentum of the granular material, and (c) the extent to which the flow of granular material is deflected by the sidewall member 42 of the base member 34 and therefore absorbs momentum. The structure of the vanes 62–68 causes these factors to be balanced in such a manner as to allow the base member 34 to rotate at a substantially constant angular velocity. The balancing of these factors is particularly difficult given the fact that the flow of granular material from the conical member 26 onto the base member 34 is generally uneven. This is because the inflow of granular material to the conical member 26 is not typically directed to the center of the conical member 26, but is typically directed to the sides of the conical member 26.

The manner in which the vanes 62–68 serve to balance these factors to cause the base member to rotate at a substantially constant angular velocity is illustrated in FIGS. 8(A)–(F). Region A as shown in FIGS. 8(A)–(F) represents an area where the amount of granular material flowing from the conical member 26 to the base member 34 is relatively low, while the region B represents an area on the base member 34 where the amount of granular material flowing from the conical member 26 to the base member 34 is relatively high. In addition, the arrows shown in FIGS. 8(A)–(F) which extend from region B of the base member 34 serve to indicate the direction of flow of granular material from region B along the base member 34. While the inflow of granular material received by the base member 34 has generally been divided into two regions, it will be understood that this representation has been used for purposes of simplifying this discussion.

Figure 8A:
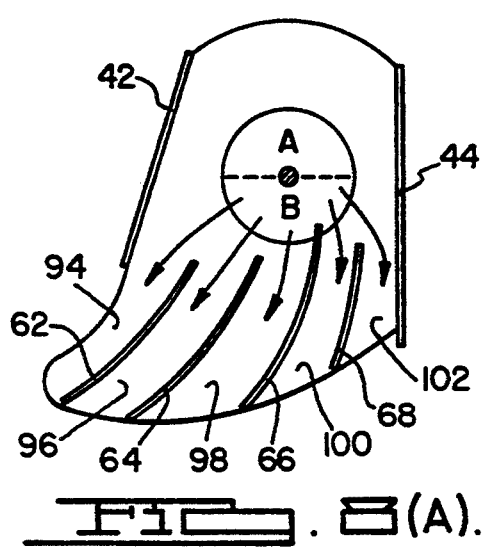
FIGS. 8(A)-(F) are elevational views of the base member of the apparatus for distributing granular material shown in FIG. 4 illustrating the flow of granular material along the base member.

When the base member 34 is oriented in the position shown in FIG. 8(A), the amount of granular material flowing through each of the flow paths 94–102 is approximately the same. The momentum which is absorbed by the vanes 62–68 which tends to cause the base member 34 to rotate in a counterclockwise direction is therefore primarily the result of the deflection of the granular material which is deflected by the concave surfaces of the vanes 62–68. The flow of granular material acting on the convex surfaces of the vanes 62–68 is relatively low as is the flow of granular material which is acting on the sidewall member 42. Accordingly, a relatively small amount of granular material is deflected by the convex surfaces of the vanes 62–68 and the sidewall member 42 and therefore the momentum absorbed by the vanes 62–68 which tends to oppose counterclockwise rotation of the base member 34 is relatively low.

Figure 8B:
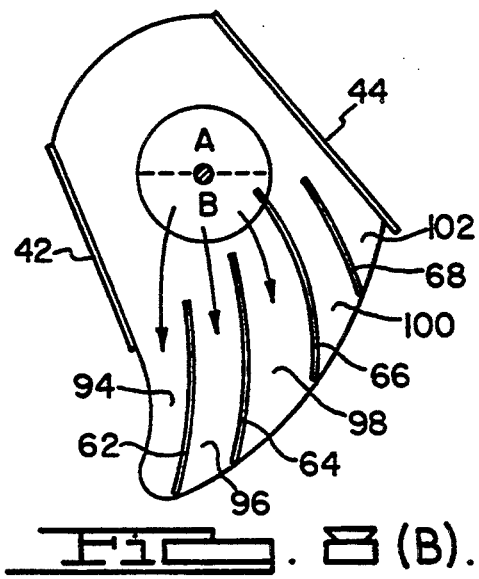

As base member 34 rotates to the position shown in FIG. 8(B), there is an increase in the flow of the granular material through the flow paths 94–98 while there is a decrease in flow of granular material through the flow paths 100 and 102. Because the amount of granular material flowing through the flow paths 94–98 increases, there is also a corresponding increase in the granular material flowing along the base member 34 which is deflected by the concaved surfaces of the arcuate portions 86–90 of the vanes 62–66 which have the greatest degree of curvature. Accordingly, the vanes 62–66 therefore absorb more momentum from the granular material which would otherwise tend to cause an increase in angular velocity of the base member 34 in the counterclockwise direction. However, there is also a corresponding increase in the amount of granular material deflected by the convex surfaces of the vanes 62–66 as well as by the sidewall member 42, both of which tend to oppose the counterclockwise rotation of the base member 34. As a result, the angular velocity of the base member 34 tends to remain substantially constant.

Figure 8C:
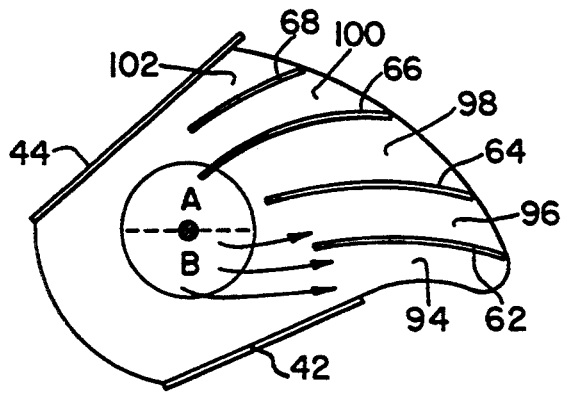

As the base member 34 continues to rotate to a position shown in FIG. 8(C), the flow of granular material flowing through the flow paths 94 and 96 increases while there is a decrease in flow of granular material through the flow paths 98–102. Because the vanes 62–64, which establish the flow paths 94 and 96, have arcuate portions 86 and 88 with the highest degree of curvature, a relatively large amount of granular material is deflected by the concave surfaces of the vanes 62 and 64. While this would otherwise cause the angular velocity at which the base member 34 rotates to increase in the counterclockwise direction, there is also a corresponding increase in the amount of granular material acting on the sidewall member 42 as well as the convex surfaces of the vanes 62 and 64 which tends to oppose the counterclockwise rotation of the base member 34. Accordingly, the angular velocity of the base member 34 remains substantially constant.

Figure 8D:
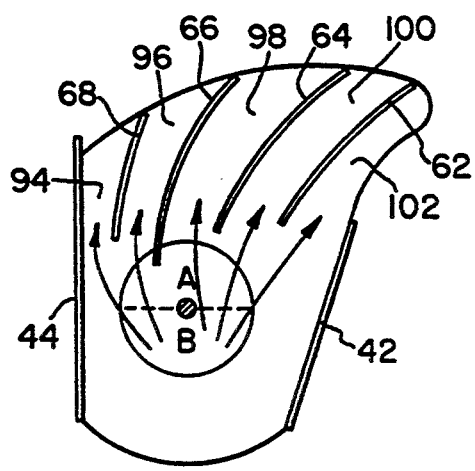

As the base member 34 is rotated further to a position shown in FIG. 8(D), the flow of granular material through the flow paths 94–102 is more evenly distributed when compared to the position of the base member 34 shown in FIG. 8(C). Accordingly, the amount of granular material flowing through the flow paths 94 and 96 which are defined in part by the arcuate portions 86 and 88 which have the greatest curvature is reduced and therefore the momentum absorbed from the granular material by the concave surfaces of vanes 62 and 64 is reduced. While this would otherwise cause the angular velocity at which the base member 34 rotates to decrease in the counterclockwise direction, less granular material is also acting on the sidewall member 42 as well as the convex surfaces of the vanes 62 and 64. Accordingly, there is also a decrease in the forces which tend to oppose counterclockwise rotation of the base member 34. As a result, the base member 34 rotates at a substantially constant angular velocity.

Figure 8E:
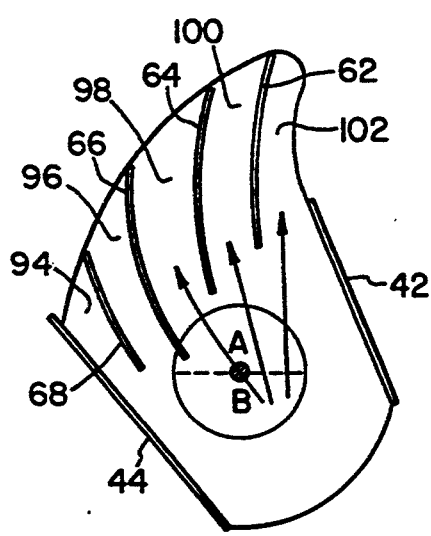
Figure 8F:
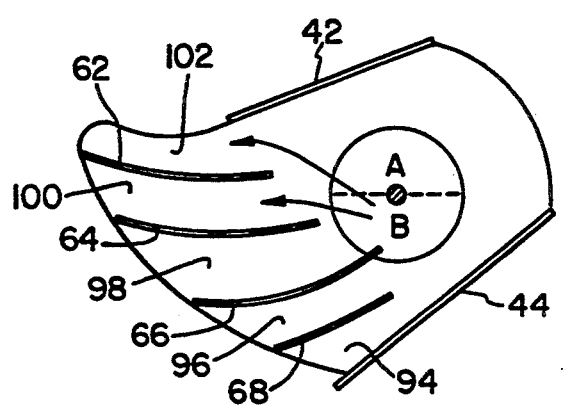

As the base member 34 rotates into a position shown in FIG. 8(E), the amount of granular material flowing through the flow paths 94–98 again increases. Accordingly, the momentum which is absorbed by the concaved surfaces of the vanes 62–66 tends to increase the angular velocity at which the base member 34 rotates in the counterclockwise direction. However, there is also a corresponding increase in the amount of momentum absorbed by the sidewall member 42 as well as by the convex surface of the vanes 62–66 which tends to oppose rotation of the base member in the counterclockwise direction. As a result, there is substantially no change in the angular velocity at which the base member 34 rotates. After the base member 34 rotates to the position shown in FIG. 8(F), the flow of granular material through the flow paths 94 and 96 increases which increases the momentum absorbed by the concave surfaces of the vanes 62 and 64. At the same time, there is an increase in the amount of granular material acting on the sidewall member 42 as well as on the convex surface of the vanes 62 and 64. Accordingly, the angular velocity at which the base member 34 rotates remains substantially uniform.

The method of the present invention will now be described. Initially, the base member 34 is formed having vanes 62–68 which create the flow paths 94–102 for the inflow of a granular material. The flow of granular material through the flow paths 94–102 causes the vanes 62–68 to absorb momentum from the granular material which induces base member 34 to rotate. The flow of the granular material through each of the flow paths 94–102 is then changed while the base member 34 rotates which causes a change in the momentum which is absorbed by the vanes 62–68. As a result of this change in the momentum which is absorbed by the vanes 62–68, the base member 34 rotates at a substantially uniform angular velocity.

Figure 9:
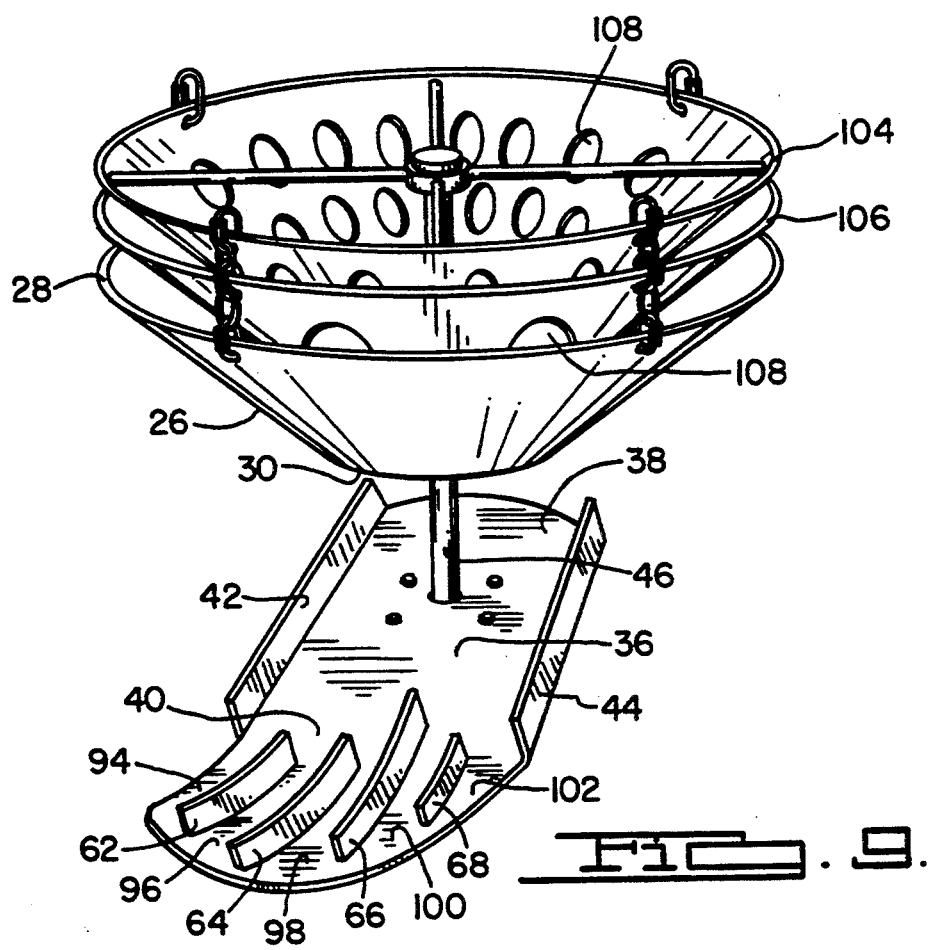
FIG. 9 is a perspective view of the apparatus for distributing granular material according to the teachings of another preferred embodiment of the present invention.

The second preferred embodiment of the present invention will now be described with reference FIG. 9. In this regard, like numerals will be used to reference similar elements which have been described in conjunction with the first preferred embodiment of the present invention. The apparatus 10 includes a conical member 26 which is operable to receive an inflow of granular material from a dispensing device 14. The conical member 26 is connected to a region of the cover portion 18 which is approximate to the open end 16 of the container 12 by a plurality of mechanical linkages 32. The apparatus 10 further includes a base member 34 which receives the inflow of granular material from the conical member 26 and distributes the constituents granular material in a substantially uniform-manner within the container 12. The base member 34 has a plurality of vanes 62–68, which are operable to form a plurality of flow paths 94–102, as well as first and second sidewall members 42 and 44 which serve to guide the flow of granular material along the base member 34 to the lower end portion 40 of the base member 34. In addition, the apparatus 10 further includes a base support member 46 which extends downwardly from the conical member 26 to the base member 34 and is used to support the base member 34 within the container 12.

To provide means for directing the inflow of the granular material into the conical member 26, the apparatus 10 further includes a first apertured conical member 104 and a second apertured conical member 106. The first and second apertured conical members 104 and 106 are disposed coaxially with respect to each other as well as with respect to the conical member 26. The first and second apertured conical members 104 and 106 each include a plurality of apertures 108 which are located such that the apertures 108 in the first apertured conical member 104 are laterally displaced with respect to the apertures 108 in the second apertured conical member 106. The apertures 108 in the first and second apertured conical members 104 and 106 disburse the inflow of granular material into the apparatus 10 so that the inflow is received more evenly by conical member 26.

Figure 10:
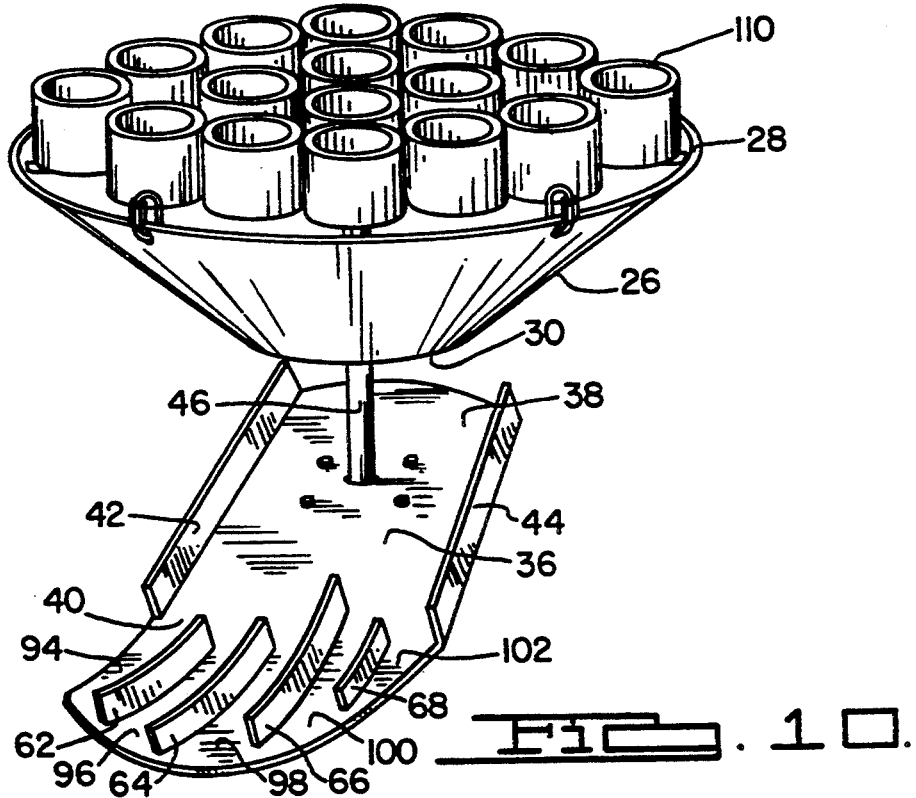
FIG. 10 is a perspective view of an apparatus for distributing granular material according to the teachings of yet another preferred embodiment of the present invention.

Another preferred embodiment of the present invention is shown in FIG. 10. In this regard, like reference numerals are used to identify similar structures. The apparatus 10 includes a conical member 26 which is operable to receive an inflow of granular material from a dispensing device 14, and is connected to the region of the cover portion 18 which is approximate to the open end 16 of the container 12 by a plurality of mechanical linkages 32. The apparatus 10 further includes a base member 34 which receives the inflow of granular material from the conical member 26 and distributes the constituents of the granular material in a substantially uniformly within the container 12. The base member 34 has a plurality of vanes 62–68 which are operable to form a plurality of flow paths 94–102, as well as first and second sidewall members 42 and 44 which serve to guide the flow of granular material along the base member 34 to the lower end portion 40 of the base member 34. In addition, the apparatus 10 further includes a base support member 46 which extends downwardly from the conical member 26 to the base member 34 and is used to support the base member 34 within the container 12.

The apparatus 10 further includes a plurality of tubular members 110. The tubular members 110 are disposed on the upper portion 28 of the conical member 26 and have apertures 112 which extend vertically. The tubular members 110 serve to receive an inflow of granular material and channel the granular material into the conical member 26. By channeling the granular material in this manner, the inflow of granular material is received more evenly by the conical member 26.

Those skilled in the art can now appreciate from the foregoing description that the broad teachings of the present invention can be implemented in a variety of forms. Therefore, while this invention has been described in connection with particular examples thereof, the true scope of the invention should not be so limited.

For example, the base member may be of other geometric structures which nevertheless serve to form a plurality of flow paths for the granular material. In this regard, the vanes may be of different shapes and configurations as may be the end portions of the base member. In addition, the orientation of the vanes on the base member may also vary. Furthermore, the base member may preferably rotate at an angular velocity of less then approximately 10 revolutions per minute, the base member may rotate at other angular velocities so long as distribution of the granular material is generally evenly and/or uniformly distributed within the container as described above. Other modifications will become apparent to those skilled in the art.

What is claimed is:

1. An apparatus for distributing an inflow of a granular material into a container, said inflow of said granular material entering said container with a given momentum, said apparatus comprising:
   means for distributing said granular material in said container by absorbing momentum from said inflow of said granular material, said means for distributing said granular material including:
   (a) at least one orientable flow path defined by said means for distributing said granular material for directing said inflow of said granular material into said container, and
   (b) the orientation of said at least one flow path being changeable by absorbing momentum from said granular material by said means for distributing said granular material.

2. The apparatus for distributing an inflow of a granular material as set forth in claim 1, wherein said granular material includes a plurality of constituents, said means for distributing said granular material being operable to distribute said constituents substantially uniformly within said container.

3. The apparatus for distributing an inflow of a granular material as set forth in claim 1, wherein said means for distributing said granular material is operable to distribute said granular material substantially evenly within said container.

4. The apparatus for distributing an inflow of a granular material as set forth in claim 1, wherein said means for distributing said granular material includes a plurality of vanes which are operable to absorb momentum from said inflow of said granular material.

5. The apparatus for distributing an inflow of a granular material as set forth in claim 4, wherein said means for distributing said granular material further includes a base member mechanically communicating with said plurality of vanes, the momentum absorbed by said plurality vanes being operable to cause said base member to rotate at a substantially constant angular velocity.

6. The apparatus for distributing the inflow of a granular material as set forth in claim 4, wherein said plurality of vanes are of different shapes.

7. The apparatus for distributing an inflow of a granular material as set forth in claim 4, wherein at least one of said vanes is longer than two adjacent vanes.

8. The apparatus for distributing an inflow of a granular material as set forth in claim 4, wherein each of said vanes includes an arcuate portion having different curvatures.

9. The apparatus for distributing an inflow of a granular material as set forth in claim 1, wherein said means for distributing said granular material includes a base member having a plurality of vanes disposed thereon, each of said vanes having a generally arcuate portion and being oriented on said base member in order of increasing curvature of said arcuate portions.

10. The apparatus for distributing an inflow of a granular material as set forth in claim 1, wherein said means for distributing said granular material includes:
   (a) a base member rotatably disposed within said container and being operable to receive said granular material; and
   (b) a plurality of flow paths operable to allow said granular material received by said base member to be distributed within said container, whereby the flow of said granular material through said plurality of flow paths is operable to cause said base member to rotate at a substantially constant angular velocity within said container.

11. The apparatus for distributing an inflow of a granular material as set forth in claim 10, wherein said base member includes:
   (a) at least one sidewall operable to guide the flow of granular material received by said base member;
   (b) a plurality of vanes which cooperate with said sidewall member and said base member to form said plurality of flow paths.

12. The apparatus for distributing an inflow of a granular material as set forth in claim 10, wherein said base member includes a generally asymmetrically curvilinear end portion at least partially defining said plurality of flow paths.

13. The apparatus for distributing an inflow of a granular material as set for in claim 1, wherein said means for distributing said granular material includes a base member and a base support member, at least a portion of said base member being canted with respect to said base support member.

14. The apparatus for distributing an inflow of a granular material as set forth in claim 13, further comprising means for changing the position of said base member in response to the height of said granular material in said container.

15. The apparatus for distributing an inflow of granular material as set forth in claim 14, wherein said means for changing the position of said base member in response to the height of said granular material in said container comprises a plurality of mechanical linkages which are operable to permit limited rotational movement of said apparatus within said container.

16. The apparatus for distributing an inflow of a granular material as set forth in claim 1, further comprising:
   a conical member for receiving said inflow of said granular material, said conical member having a first portion operable to receive said inflow of granular material and a second portion operable to deliver said inflow of granular material to said means for distributing said granular material; and
   means for directing said inflow of said granular material into said second portion of said conical member.

17. The apparatus for distributing an inflow of a granular material as set forth in claim 16, wherein said means for directing said inflow of said granular material into said second portion of conical member includes a plurality of support members attached to said conical member.

18. The apparatus for distributing said inflow of a granular material as set forth in claim 16, wherein said means for directing said inflow of said granular material into said second portion of said conical member includes a plurality of aperture members operable to receive said inflow of granular material.

19. The apparatus for distributing said inflow of a granular material as set forth in claim 16, wherein said means for directing said inflow of granular material into said second portion of said conical member includes a plurality of tubular members operable to receive said inflow of granular material.

20. A method for distributing an inflow of a granular material into a container, said inflow of said granular material entering said container with a given momentum, said method comprising the steps of:
   forming at least a first flow path and a second flow path for said inflow of said granular material, said first and second flow paths being operable to distribute said granular material into said container;
   absorbing momentum of said inflow of said granular material entering said container; and
   changing the direction of the flow of said granular material through each of said first and second flow paths by absorbing momentum of said granular material so as to cause said granular material to be substantially evenly distributed within said container.

21. The method for distributing granular material into a container according to claim 20, wherein said step of forming at least a first and a second flow path includes the step of allowing said granular material to flow between a plurality of vanes of different shapes.

22. The method for distributing an inflow of a granular material according to claim 20, wherein said step of forming at least a first flow path and a second flow path includes the step of allowing said granular material to flow between two vanes having arcuate portions of different shapes.

23. The method for distributing an inflow of a granular material according to claim 22, wherein said step of absorbing momentum of said inflow of said granular material includes the step of changing the momentum absorbed from said inflow of said granular material by a plurality of vanes so as to substantially evenly distribute said granular material within said container.

24. The method according to claim 20, wherein said step of changing the flow of granular material through said first and second flow paths includes the steps of:
   (a) disposing a plurality of vanes on a rotatable base member; and
   (b) allowing said granular material to exert force on said vanes to cause said base member to rotate at a substantially constant angular velocity.

25. A method for distributing an inflow of a granular material into a container, said inflow of said granular material entering said container with a given momentum, said method comprising the steps of:
   forming an orientable flow path for said inflow of said granular material, said flow path being operable to distribute said granular material into said container;
   absorbing momentum of said inflow of said granular material entering said container; and
   changing the orientation of the flow path by absorbing momentum of said granular material so as to cause said granular material to be distributed within said container.

26. A container for receiving an inflow of a granular material having a given momentum, said container comprising:
   a cover portion for covering said granular material received by said container;

a sidewall member for confining said granular material received by said container; and means for distributing said granular material within said container by absorbing momentum from said inflow of said granular material, said means for distributing said granular material including:

(a) at least one orientable flow path defined by said means for distributing for directing said inflow of said granular material into said container, and the orientation of said at least one flow path being changeable by absorbing momentum from said granular material by said means for distributing said granular material;

said means for distributing said granular material being disposed within said container.

27. The container for receiving an inflow of a granular material as set forth in claim 26, wherein said cover portion is generally conical in shape and has an angle of inclination substantially equal to the angle of repose of said granular material.

28. The container for receiving an inflow of a granular material as set forth in claim 26, wherein said cover portion is generally conical in shape and has an angle of inclination of about 40°.

29. The container for receiving an inflow of a granular material as set forth in claim 26, wherein said means for distributing said granular material within said container includes means for defining a plurality of flow paths for said granular material.

30. The container for receiving an inflow of a granular material as set forth in claim 29, wherein said means for defining a plurality of flow paths includes a plurality of vanes each having a generally arcuate portion.

31. The container for receiving an inflow of a granular material as set forth in claim 30, wherein the curvature of each of said arcuate portions of said vanes is different.

32. An apparatus for distributing an inflow of a granular material into a container, said apparatus comprising:

a base member which is operable to rotate within said container;

a first vane member mechanically communicating with said base member and being operable to at least partially define a first orientable flow path for said granular material; and a second vane member mechanically communicating with said base member and being operable to at least partially define a second orientable flow path for said granular material, whereby the flow of said granular material through said first and second flow paths is operable to change the orientation of said first and second flow paths upon absorbing momentum from said granular material so as to cause said base member to rotate at a substantially constant angular velocity.

33. The apparatus for distributing an inflow of a granular material according to claim 32, further comprising a third vane mechanically communicating with said base member and being operable to at least partially form a third flow path for said granular material.

34. The apparatus for distributing an inflow of a granular material according to claim 33, wherein each of said vanes includes an arcuate portion having different curvatures.

35. The apparatus for distributing an inflow of a granular material according to claim 34, wherein said vanes are disposed on said base member in order of the curvature of the arcuate portions associated with said vanes.

36. The apparatus for distributing an inflow of a granular material according to claim 33, wherein said second vane is longer than said first and third vanes and said second vane is disposed on said base member between first and third vanes.

37. The apparatus for distributing an inflow of granular material according to claim 36, further comprising a fourth vane having an arcuate portion with curvature different from the curvature of the arcuate portions of said first, second and third vanes.

38. The apparatus for distributing an inflow of granular material according to claim 37, wherein said base member includes:

(a) a channel portion operable to receive said inflow of said granular material, and (b) a curvilinear portion operable to receive said granular material from said channel portion and distribute said granular material within said container.

39. The apparatus for distributing an inflow of a granular material according to claim 38, wherein said apparatus further includes a base support member which is able to support said base member within said container, said base member being operable to rotate about said base support member so as to change the amount of granular material flowing through said first and second flow paths.

40. The apparatus for distributing an inflow of granular material according to claim 39, further comprising a plurality of mechanical linkages mechanically communicating with said container, said plurality of mechanical linkages being operable to permit limited rotational movement of said apparatus within said container.

41. A method for distributing an inflow of a granular material within a container, said inflow of said granular material entering said container with a given momentum and including a first region of relatively high inflow and a second region of relatively low inflow, said method comprising the steps of:

forming at least a first and second flow path for said granular material to flow into said container;

absorbing momentum of said inflow of said granular material entering said container; and varying the amount of granular material delivered from said first and second regions of said inflow to said first and second flow paths by absorbing momentum of said inflow of granular material so as to cause said granular material to be substantially evenly distributed within said container.

42. The method for distributing an inflow of granular material as set forth in claim 41, wherein said granular material has a plurality of constituents, said method further comprising the additional step of varying the amount of granular material delivered from said first and second regions of said inflow to said first and second flow paths so as to cause said constituents of said granular material to be substantially uniformly distributed within said container.

43. The method for distributing an inflow of a granular material as set forth in claim 41, further comprising the additional step of absorbing momentum from said granular material flowing through said first and second flow paths so as to cause the granular material to be substantially uniformly distributed in said container.

44. The method for distributing an inflow of a granular material as set forth in claim 43, wherein said step of absorbing momentum from said granular material flowing through said first and second flow paths includes the step of causing the momentum absorbed from said granular material to rotate said first and second flow paths.

45. The method for distributing an inflow of a granular material as set forth in claim 41, wherein said first flow path is at least partially formed by a first vane having an arcuate portion and said second flow path is at least partially formed by a second vane having an arcuate portion, the curvature of said arcuate portion of said second vane being different from the arcuate portion of said first vane, said step of selectively absorbing momentum from said granular material flowing through said first and second flow paths includes the step of allowing granular material flowing through said first and second flow paths to be deflected by said arcuate portions of said first and second vanes.

* * * * *